US006929145B2

(12) United States Patent
Shepler

(10) Patent No.: US 6,929,145 B2
(45) Date of Patent: Aug. 16, 2005

(54) REUSABLE STORAGE CONTAINER WITH LATCHING MECHANISM

(75) Inventor: William Shepler, Brunswick, OH (US)

(73) Assignee: Rubbermaid Incorporated, Wooster, OH (US)

( * ) Notice: Subject to any disclaimer, the term of this patent is extended or adjusted under 35 U.S.C. 154(b) by 160 days.

(21) Appl. No.: 10/431,950

(22) Filed: May 8, 2003

(65) Prior Publication Data

US 2004/0000557 A1 Jan. 1, 2004

Related U.S. Application Data

(60) Provisional application No. 60/382,748, filed on May 23, 2002.

(51) Int. Cl.⁷ .............................................. B65D 41/16
(52) U.S. Cl. .................................... 220/788; 220/309.2
(58) Field of Search ................................ 220/788, 784, 220/786, 790, 792, 309.2, 780, 326, 324, 322, 323, 318, 771, 772, 783, 904, 526

(56) References Cited

U.S. PATENT DOCUMENTS

| 4,356,930 | A | * | 11/1982 | Roper ......................... 220/783 |
| 4,397,404 | A | * | 8/1983 | Blanchette ................... 220/783 |
| 4,458,825 | A | * | 7/1984 | Holota ......................... 220/782 |
| 4,541,529 | A | | 9/1985 | Hestehave et al. |
| 4,995,513 | A | | 2/1991 | Rosler |
| 5,762,231 | A | * | 6/1998 | Rider et al. .................. 220/526 |
| 5,904,269 | A | * | 5/1999 | Wolff .......................... 220/756 |
| 5,906,291 | A | | 5/1999 | Mann et al. |
| 5,971,183 | A | | 10/1999 | Bartsch |
| 6,039,368 | A | | 3/2000 | Kowalczyk |
| 6,250,494 | B1 | * | 6/2001 | Diamond ..................... 220/783 |
| 6,491,185 | B1 | * | 12/2002 | Azzarello et al. ............ 220/783 |
| 6,588,618 | B1 | * | 7/2003 | Davis ....................... 220/254.7 |
| 2002/0043512 | A1 | | 4/2002 | Sandor et al. |
| 2003/0010787 | A1 | | 1/2003 | Dalton et al. |

FOREIGN PATENT DOCUMENTS

| DE | 24 56 723 B1 | | 3/1976 | |
| GB | 2086862 | * | 5/1982 | ................. 220/782 |
| GB | 2096116 | * | 10/1982 | ................. 220/783 |
| WO | WO 01/19697 A1 | | 3/2001 | |
| WO | WO 02/06035 A1 | | 1/2002 | |

* cited by examiner

*Primary Examiner*—Lien M. Ngo
(74) *Attorney, Agent, or Firm*—Marshall, Gerstein & Borun LLP

(57) ABSTRACT

A three-dimensional reusable plastic storage container is disclosed with an improved latching mechanism between the lid and container portion thereof. Biased latching mechanisms are disposed on opposing ends of the lid and are received in recesses disposed on opposing ends of the container, at the upper rim thereof. The disclosed latching mechanism is applicable to blow molded container with inverted upper rims as well as injection molded containers with external upper rims. The latching mechanisms do not interfere with the use of or the ergonomic design of handles disposed on the opposing ends of the container.

56 Claims, 2 Drawing Sheets

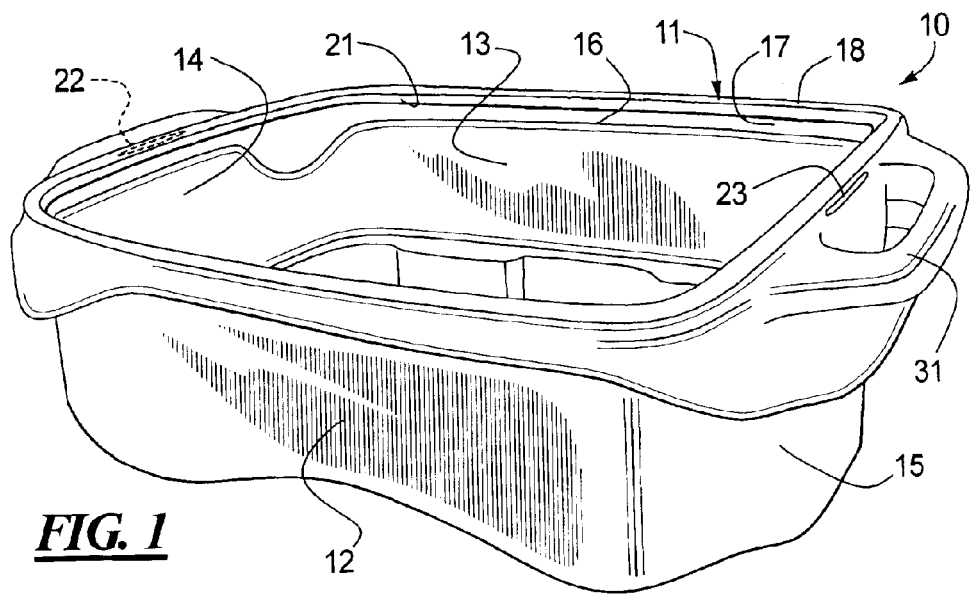
*FIG. 1*
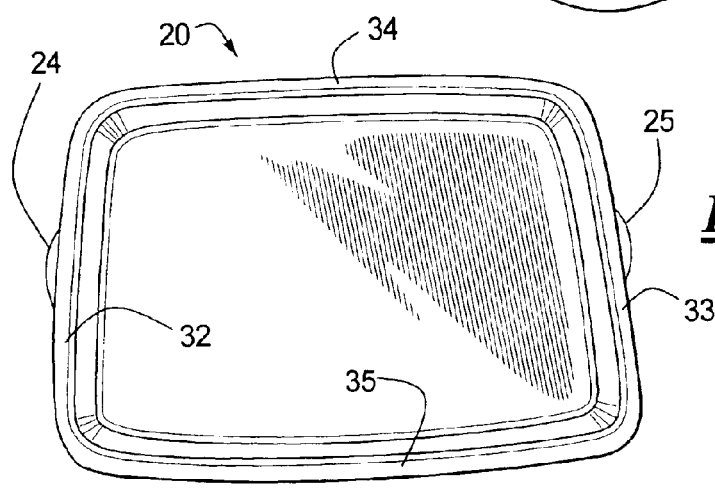
*FIG. 2*
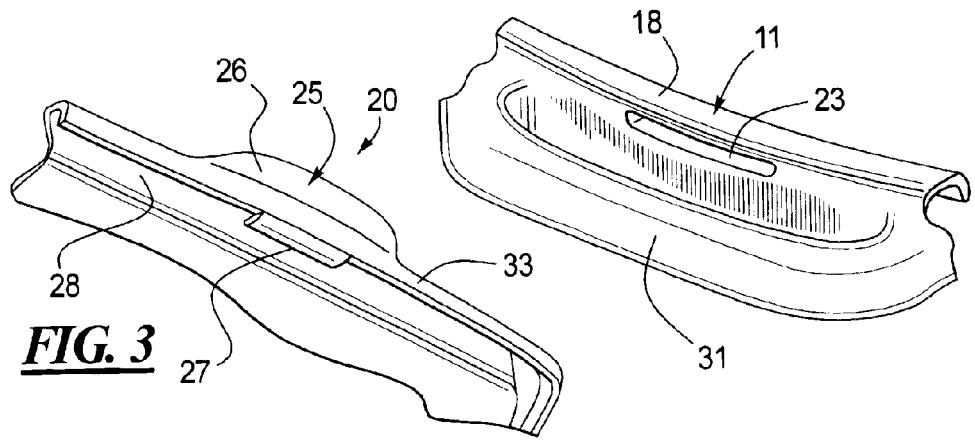
*FIG. 3*  *FIG. 4*

REUSABLE STORAGE CONTAINER WITH LATCHING MECHANISM

CROSS-REFERENCE TO RELATED APPLICATION

This application claims the benefit under 35 U.S.C. §119 (e) of U.S. provisional patent application Ser. No. 60/382,748 filed May 23, 2002, the disclosure of which is incorporated herein by reference.

BACKGROUND

1. Technical Field

An improved reusable plastic storage container is disclosed. More specifically, a reusable plastic storage container is disclosed which includes an upper rim that engages an under surface of a lid. The upper rim includes at least one recess and the lid includes at least one pivoting latch that is received in the recess when the lid is pressed down onto the upper rim of the container to provide a simple and effective latching mechanism for the reusable plastic storage container.

2. Description of Related Art

Reusable storage containers are known. One common type of reusable storage container is fabricated from molded plastic in the form of an open-top box with a molded plastic lid. Such containers come in a variety of styles and colors.

Most currently available reusable storage containers have an external rim that extends laterally outward from the top of the sidewalls of the container and turns downward. Such containers are typically made from an injection molding process. The external rim enhances the structural integrity of the container. Further, the underside of an external rim can be used for latching a lid or top onto the container. Specifically, a pivoting latch can be provided on the lid or top and, after the lid is placed on the rim, the latch is pivoted downward to engage the underside of the external rim.

However, containers with an external rim (i.e., a flange extending outward from the top of the sidewalls and then downward) must be fabricated using an injection molding process as the geometry of such a rim does not lend itself to a more economical process such as blow molding, continuous blow molding or continuous extrusion blow molding processes. Injection molding processes are becoming less favored in the reusable storage container industry because of the relatively low production rates and therefore relatively high cost. As a result, the various blow molding processes are becoming favored over conventional injection molding processes due to their higher production rates and therefore reduced manufacturing costs.

However, blow molding processes can not be utilized to fabricate a reusable container with an external rim as described above. In contrast, blow molding processes can be used to fabricate a container with an inverted rim or an upper rim that extends laterally inward towards the storage compartment. Such an internal rim does not provide a suitable surface for a latching mechanism. As a result, container structures with internal rims typically rely upon the handle as a latching point for securing the lid to the container.

Use of the handle or handles to secure the lid to the container is disadvantageous if an attempt is made to provide an ergonomically sound handle. Specifically, if the handle is used to secure a latch connected to the lid or top, the handle must have an angled corner or surface to provide a suitable point for engaging the latch. Such an angled surface or point makes the handle ergonomically unfavorable because when a large reusable storage container is filled with heavy material, any non-curved surface on the handle will cause discomfort to the user's hand. Further, placement of a latch on the handle itself may also cause interference between the consumer's hand and the latch thereby causing discomfort.

Therefore, there is a need for an improved reusable storage container with an inverted or internal rim that can be fabricated using a blow molding process and that includes a convenient and effective latching mechanism for securing the lid to the container. Further, there is a need for an improved latching mechanism for a reusable storage container that does not rely upon the container handles as a latching point.

SUMMARY OF THE DISCLOSURE

A more economical and ergonomic reusable three-dimensional storage container and lid are disclosed.

In one disclosed design, a reusable storage container comprises a container portion and lid. The container portion comprises an open-box structure with a continuous inverted upper rim that extends laterally inward towards the storage compartment. The upper rim comprises an engagement surface and at least one recess. The lid comprises a panel that engages the upper rim of the container portion. The panel further comprises at least one latch pivotally connected to the panel. The latch is received in the recess of the upper rim when the panel engages the upper rim of the container portion.

In a refinement, the latch comprises an outwardly extending tab pivotally connected to the panel. The tab is biased into a position where it is received in the recess of the upper rim when the lid is disposed on the upper rim. Downward force imposed on the lid towards the upper rim results in the tab being snapped into place into the recess to secure the lid to the upper rim of the container portion.

In a further refinement, the lid comprises two latches, disposed at opposing ends of the lid and the upper rim comprises two recesses, disposed at opposing ends of the container portion. The two latches of the lid are received to the recesses of the upper rim of the container portion when the lid is pressed down onto the upper rim of the container portion.

The container portion with its inverted rim can be formed by a blow molding process, a continuous blow molding process or a continuous co-extrusion blow molding process. In contrast, the lid can be formed by any of these processes as well as an injection molding process.

In a further refinement, the upper rim of the container portion comprises a lower section and an upper section. The lower section extends generally upward to the upper section which, in turn, extends laterally inward and provides a flat engagement surface for engaging the lid. The recess for receiving the latch may be disposed in the upper section of the upper rim or the lower section of the upper rim. In other words, the recess for receiving the latch may be disposed on a flat engagement surface portion of the upper firm or on a sidewall portion of the upper rim.

The container portion may be fabricated from a wide variety of polymeric materials including but not limited to polypropylene, polyethyleneterepthalate, polyvinylchloride, polycarbonate and mixtures thereof.

The lid may also be fabricated from a wide variety of polymeric materials including but not limited to polyethylene, polypropylene, polyethyleneterepthalate, polyvinylchloride, polycarbonate and mixtures thereof.

In a further refinement, the blow molded container portion of the disclosed storage container also includes handles disposed on opposing end panels. The handles comprise a smooth hollow tube that are spaced apart from the end panels in such a way to provide a sufficient finger space between the grip portion of the handle and the end panel wall of the container. The handles are ergonomically designed.

Other advantages of the disclosed containers will be apparent to those skilled in the art from a review of the following figures and detailed description.

BRIEF DESCRIPTION OF THE DRAWINGS

The disclosed containers are described diagrammatically in the following drawings wherein:

FIG. 1 is a partial perspective view of a disclosed blow molded storage container with the lid removed and particularly illustrating an inverted upper rim;

FIG. 2 is a top plan view of a lid for a disclosed container with latching mechanisms disposed on both ends;

FIG. 3 is a partial perspective view of a latching mechanism of a lid as disclosed in FIG. 2;

FIG. 4 is a partial perspective view of a recess in an upper rim of the container shown in FIG. 1 for lockingly engaging the latching mechanisms of a lid as shown in FIGS. 2 and 3;

Figure 5:
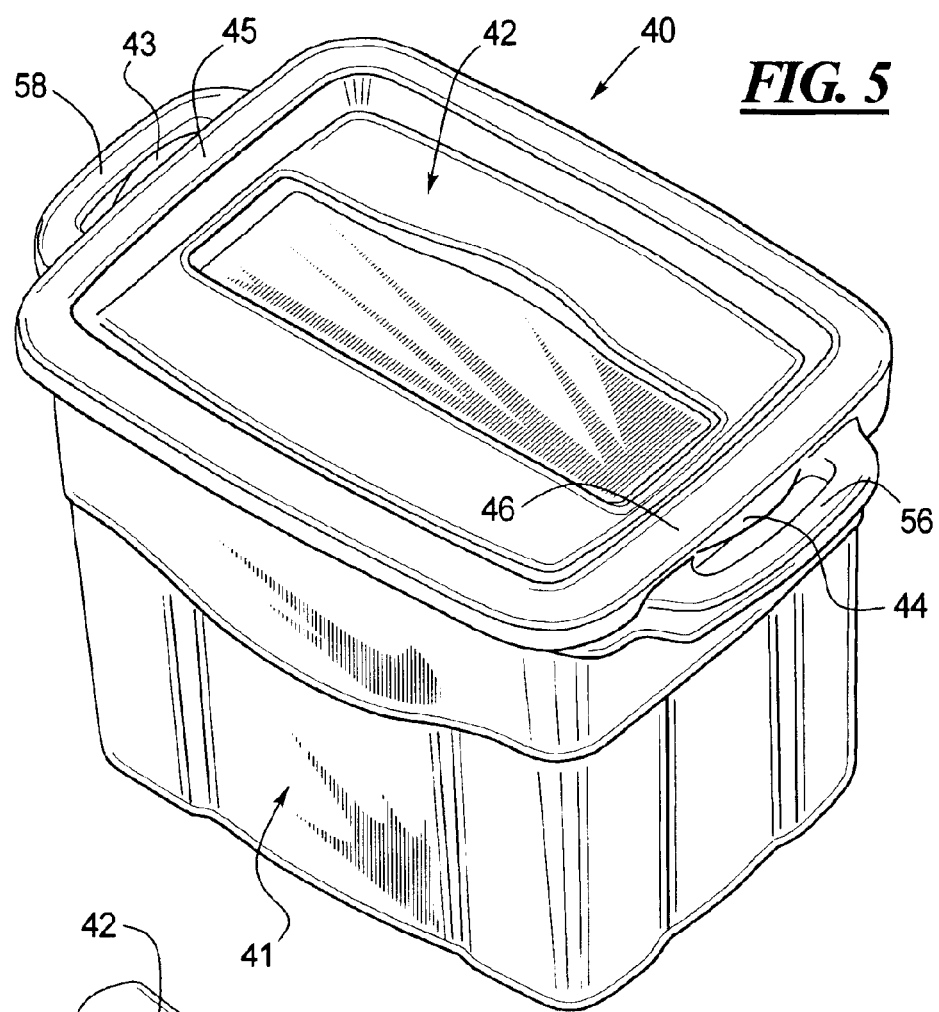
FIG. 5 is a perspective view of another disclosed reusable storage container.

The drawings are not necessarily to scale and the embodiments are sometimes illustrated by graphic symbols, phantom lines, diagrammatic representations and fragmentary views. In certain instances, details which are not necessary for an understanding of the disclosed containers or which may render other details difficult to perceive may have been omitted. It should be understood, of course, that the disclosure is not necessarily limited to the particular embodiments illustrated herein.

DETAILED DESCRIPTION OF THE PRESENTLY PREFERRED EMBODIMENTS

An improved reusable storage container 10 is illustrated in FIG. 1. The container 10 may be fabricated using a blow molding process, a continuous blow molding process or a continuous co-extrusion blow molding process. Using any one of these processes, the container 10 includes an inverted upper rim 11. While this disclosure is directed primarily to containers like the ones shown at 10 in FIG. 1 that can be fabricated using a blow molding process, it will also be noted that the latching technology disclosed herein is also applicable to containers made using an injection molding process and with an external rim. The container 10 includes opposing sidewalls 12, 13 disposed between and connected to opposing endwalls 14, 15. The walls 12–15 are all joined together to form a continuous upper rim 11. The upper rim 11 includes a lower portion 16 which is connected to a middle portion 17 which, in turn, is connected to an upper portion 18. The upper portion 18 provides a flat surface for engaging a lid 20 as shown in FIG. 2. The upper portion 18 also terminates in a downwardly protruding lip 21. Recesses 22, 23 are disposed in the upper rim 11 at the endwalls 14, 15.

The recesses 22, 23 of the upper rim 11 of the container portion 10 receive the latching mechanisms 24, 25 of the lid 20. Referring to FIG. 3, the latching mechanism 25 includes a handle portion 26 and a locking tab 27. The locking tab 27 is biased in a laterally inward direction so that when the lid 20 and specifically the outer peripheral section 28 of the lid 20 is pressed downward onto the engagement surface 18 of the upper rim 11 of the container portion 10, the locking tab 27 snaps into a recess 23 to secure the lid 20 to the container portion 10.

Preferably, the recesses 22, 23 are disposed in the upper rim 11 in alignment with the handles, one of which is shown at 31 in FIG. 1 and FIG. 4. Consequently, the latching mechanisms 24, 25 of the lid 20 are also disposed on the ends 32, 33 of the lid 20 as opposed to the sides 34, 35.

Figure 6:
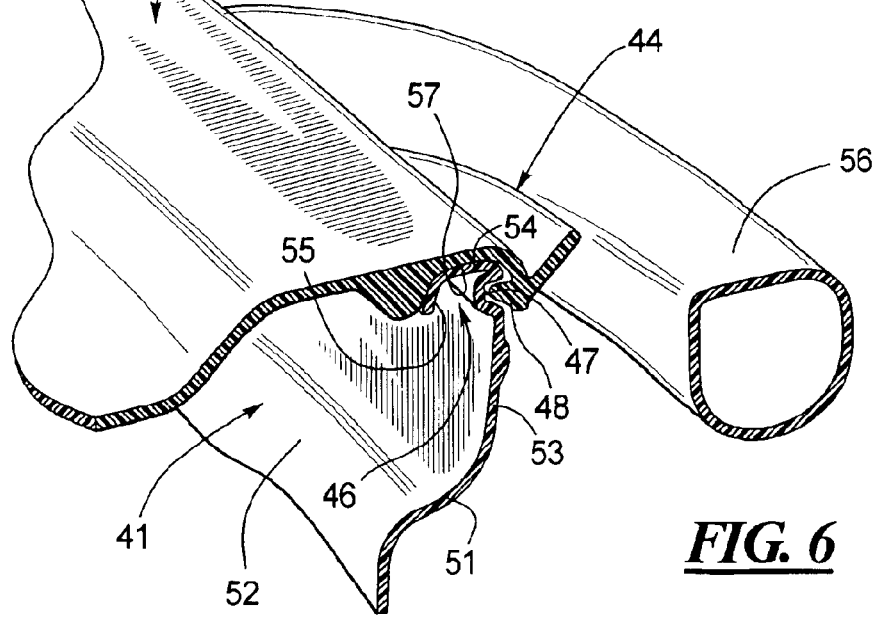
FIG. 6 is a partial perspective sectional view illustrating a latch mechanism disposed on the lid of FIG. 5 and received in a recess disposed in the upper rim of the container portion as shown in FIG. 5.

Another improved container is illustrated at 40 in FIG. 5. The container 40 includes a blow molded container portion 41 and a lid 42 that may be fabricated from a blow molded or injection molding process. The lid 42 includes latching mechanisms 43, 44 disposed at opposing ends 45, 46. Turning to FIG. 6, the container portion 41 includes an upper rim 46 with a recess 47 disposed therein for receiving the locking tab 48 of the latch mechanism 44. More specifically, the upper rim 46 includes a lower section 51 connected to the end wall 52. The lower section 51 in turn is connected to a middle section 53. The middle section 53 extends upward to an upper section 54 which terminates at a downwardly extending lip 55. At the portion of the endwall 52 in alignment with the handle 56, the upper rim 46 includes the recess 47 for accommodating the locking tab 48 of the latch mechanism 44. In the embodiment illustrated in FIG. 6, the underside of the lid 42 also includes a shaped engagement surface 57 for engaging the upper section 54 of the upper rim 46.

In both the lid 20 and the lid 42, the latching mechanisms 24, 25 and 43, 44 are molded from the same material used to fabricate the lids 20, 42. The latching mechanism are biased into a recess engaging position and therefore when the lids 20, 42 are pressed downward onto their respective containers, the locking tabs 27, 48 snap into the respective recesses 23, 47.

Thus, the latching mechanisms disclosed do not interfere with the ergonomically designed handles shown at 31 (FIG. 1) or 56, 58 (FIG. 5). Thus, the ergonomic design of these handles is not compromised. Further, the latching mechanisms disclosed, while clearly applicable to the blow molded container portions 20, 41, are also applicable to injection molded containers with an external rim.

The foregoing detailed description is given for clearness of understanding only, and no unnecessary limitations should be understood therefrom, as modifications within the spirit and scope of this disclosure may become apparent to those skilled in the art.

What is claimed:

1. A storage container comprising:
   a container portion comprising
      an open-box structure with a bottom panel connected to two end panels disposed between two side panels and a continuous inverted upper rim that connects the side and end panels, the upper rim extending laterally inward, the upper rim comprising an engagement surface and at least one recess,
   each of the end panels comprising a handle, each handle comprising a hollow tube with two ends connected to its respective end panel and a portion of the hollow tube being spaced apart from its respective end panel with a finger space disposed therebetween, the portion of the hollow tube having a smooth profile with no sharp edges, a lid comprising
  a panel that engages the upper rim of the container portion, the panel further comprising a latch pivotally connected thereto,
  the latch being received in the recess of the upper rim when the panel engages the upper rim.

2. The storage container of claim 1 wherein the latch comprises and outwardly extending tab connected to the panel, the tab being biased into a position where it is received in the recess of the upper rim when the lid is disposed on the upper rim.

3. The storage container of claim 1 wherein the lid comprises two latches and the upper rim comprises two recesses, one of the recesses receiving one of the latches and the other of the recesses receiving the other of the latches when the lid is disposed on the upper rim.

4. The storage container of claim 1 wherein the container portion is formed by a blow molding process.

5. The storage container of claim 1 wherein the container portion is formed by a continuous blow molding process.

6. The storage container of claim 1 wherein the container portion is formed by a continuous co-extrusion blow molding process.

7. The storage container of claim 1 wherein the lid is formed by an injection molding.

8. The storage container of claim 1 wherein the upper rim further comprises a lower section and an upper section, the lower section extending upward to the upper section, the upper section extending laterally inward, the upper section providing an upper flat engagement surface for the lid.

9. The storage container of claim 8 wherein the recess is disposed in the lower section of the upper rim.

10. The storage container of claim 8 wherein the recess is disposed in the upper section of the upper rim.

11. The storage container of claim 1 wherein the upper rim further comprises a lower section, a middle section, and an upper section, the lower section extending laterally outward before being connected to the middle section, the middle section extending upward from the lower section to the upper section, the upper section extending laterally inward, the upper section providing an upper flat engagement surface for the lid.

12. The storage container of claim 11 wherein the recess is disposed in the middle section of the upper rim.

13. The storage container of claim 11 wherein the recess is disposed in the upper section of the upper rim.

14. The storage container of claim 1 wherein the container portion is fabricated from a material selected from the group consisting of polypropylene, polyethyleneterepthalate, polyvinylchloride, polycarbonate and mixtures thereof.

15. The storage container of claim 1 wherein the lid is fabricated from a material selected from the group consisting of polyethylene, polypropylene, polyethyleneterepthalate, polyvinylchloride, polycarbonate and mixtures thereof.

16. The storage container of claim 1 wherein each finger space defined by each handle and end panel has a length running essentially parallel to the end panel ranging from about 3 inches to about 8 inches.

17. The storage container of claim 1 wherein each finger space defined by each handle and end panel has a width defined by a distance the portion of each hollow tube is spaced apart from its respective end panel ranging from about ½ inch to about 1¼ inches.

18. The storage container of claim 1 wherein the portion of the hollow tube has a circumference ranging from about 2 to about 4 inches.

19. The storage container of claim 1 wherein the portion of the hollow tube has an outer width greater and an outer height by a difference ranging from about ⅛ to about ¼ inches.

20. A storage container comprising:
  a container portion comprising
    a bottom panel connected to and disposed between two opposing side panels and two opposing end panels, each side panel being disposed between and connected to the opposing end panels to form an open top box structure with an interior cargo space, the two opposing side panels and two opposing end panels forming a continuous upper rim,
    the upper rim comprising a lower section, a middle section and an upper section, the lower section being connected to the opposing end and side panels, the lower section extending laterally outward and upward before being connected to the middle section, the middle section extending upward from the lower section to the upper section, the upper section extending laterally inward, the upper section providing an upper flat engagement surface for the lid, the upper section terminating at a downwardly protruding lip, the upper rim further comprising at least one recess,
  a lid comprising
    a panel that engages the upper rim of the container portion, the panel comprising two opposing sides and two opposing ends in matching registry with the upper rim and the side and end panels of the container portion when the panel engages the upper rim of the container portion, at least one of the sides or ends of the panel of the lid comprising a latch pivotally connected thereto,
    the latch being received in the recess when the lid engages the upper rim of the container portion with the sides and ends of the top panel of the lid is in matching registry with the sides panels and end panels of the container portion.

21. The storage container of claim 20 wherein the latch comprises and outwardly extending tab connected to the panel, the tab being biased into a position where it is received in the recess of the upper rim when the lid is disposed on the upper rim.

22. The storage container of claim 20 wherein the lid comprises two latches and the upper rim comprises two recesses, one of the recesses receiving one of the latches and the other of the recesses receiving the other of the latches when the lid is disposed on the upper rim.

23. The storage container of claim 20 wherein the container portion is formed by a blow molding process.

24. The storage container of claim 20 wherein the container portion is formed by a continuous blow molding process.

25. The storage container of claim 20 wherein the container portion is formed by a continuous co-extrusion blow molding process.

26. The storage container of claim 20 wherein the lid is formed by an injection molding process.

27. The storage container of claim 20 wherein the recess is disposed in the middle section of the upper rim.

28. The storage container of claim 20 wherein the recess is disposed in the upper section of the upper rim.

29. The storage container of claim 20 wherein the container portion is fabricated from a material selected from the group consisting of polypropylene, polyethyleneterepthalate, polyvinylchloride, polycarbonate and mixtures thereof.

30. The storage container of claim 20 wherein the lid is fabricated from a material selected from the group consisting of polyethylene, polypropylene, polyethyleneterepthalate, polyvinylchloride, polycarbonate and mixtures thereof.

31. The storage container of claim 20 wherein each of the end panels further comprises a handle, each handle comprising a hollow tube with two ends connected to its respective end panel and a portion of the hollow tube being spaced apart from its respective end panel with a finger space disposed therebetween, the portion of the hollow tube having a smooth profile with no sharp edges.

32. The storage container of claim 31 wherein each finger space defined by each handle and end panel has a length running essentially parallel to the end panel ranging from about 3 inches to about 8 inches.

33. The storage container of claim 31 wherein each finger space defined by each handle and end panel has a width defined by a distance the portion of each hollow tube is spaced apart from its respective end panel ranging from about ½ inch to about 1¼ inches.

34. The storage container of claim 31 wherein the portion of the hollow tube has a circumference ranging from about 2 to about 4 inches.

35. The storage container of claim 31 wherein the portion of the hollow tube has an outer width greater and an outer height by a difference ranging from about ⅛ to about ¼ inches.

36. A storage container comprising:
a container portion comprising
an open-box structure comprising a bottom panel disposed between and connected to two opposing side panels and two opposing end panels with a continuous inverted upper rim that extends laterally inward and connects the side panels to the end panels, the upper rim comprising an engagement surface, the upper rim further comprising at least one recess, the upper rim further comprising a lower section, a middle section and an upper section, the lower section extending laterally outward and upward before being connected to the middle section, the middle section extending upward from the lower section to the upper section, the upper section extending laterally inward, the upper section providing an upper flat engagement surface for the lid, the upper section terminating at a downwardly protruding lip,
a lid comprising
a panel that engages the upper rim of the container portion, the panel further comprising a latch pivotally connected thereto,
the latch being received in the recess of the upper rim when the panel engages the upper rim.

37. The storage container of claim 36 wherein the latch comprises and outwardly extending tab connected to the panel, the tab being biased into a position where it is received in the recess of the upper rim when the lid is disposed on the upper rim.

38. The storage container of claim 36 wherein the lid comprises two latches and the upper rim comprises two recesses, one of the recesses receiving one of the latches and the other of the recesses receiving the other of the latches when the lid is disposed on the upper rim.

39. The storage container of claim 36 wherein the container portion is formed by a blow molding process.

40. The storage container of claim 36 wherein the container portion is formed by a continuous blow molding process.

41. The storage container of claim 36 wherein the container portion is formed by a continuous co-extrusion blow molding process.

42. The storage container of claim 36 wherein the lid is formed by an injection molding.

43. The storage container of claim 36 wherein the recess is disposed in the middle section of the upper rim.

44. The storage container of claim 36 wherein the recess is disposed in the upper section of the upper rim.

45. The storage container of claim 36 wherein each of the end panels further comprises a handle, each handle comprising a hollow tube with two ends connected to its respective end panel and a portion of the hollow tube being spaced apart from its respective end panel with a finger space disposed therebetween, the portion of the hollow tube having a smooth profile with no sharp edges.

46. A storage container comprising:
a container portion comprising
a bottom panel connected to and disposed between two opposing side panels and two opposing end panels, each side panel being disposed between and connected to the opposing end panels to form an open top box structure with an interior cargo space, the two opposing side panels and two opposing end panels forming a continuous upper rim,
each of the end panels further comprising a handle, each handle comprising a hollow tube with two ends connected to its respective end panel and a portion of the hollow tube being spaced apart from its respective end panel with a finger space disposed therebetween, the portion of the hollow tube having a smooth profile with no sharp edges,
the upper rim comprising a lower section and an upper section, the lower section being connected to the opposing end and side panels and extending upward to the upper section, the upper section extending laterally inward, the upper rim further comprising at least one recess,
a lid comprising
a panel that engages the upper rim of the container portion, the panel comprising two opposing sides and two opposing ends in matching registry with the upper rim and the side and end panels of the container portion when the panel engages the upper rim of the container portion, at least one of the sides or ends of the panel of the lid comprising a latch pivotally connected thereto,
the latch being received in the recess when the lid engages the upper rim of the container portion with the sides and ends of the top panel of the lid is in matching registry with the sides panels and end panels of the container portion.

47. The storage container of claim 46 wherein the latch comprises and outwardly extending tab connected to the panel, the tab being biased into a position where it is received in the recess of the upper rim when the lid is disposed on the upper rim.

48. The storage container of claim 46 wherein the lid comprises two latches and the upper rim comprises two recesses, one of the recesses receiving one of the latches and the other of the recesses receiving the other of the latches when the lid is disposed on the upper rim.

49. The storage container of claim 46 wherein the container portion is formed by a blow molding process.

50. The storage container of claim 46 wherein the container portion is formed by a continuous blow molding process.

51. The storage container of claim 46 wherein the container portion is formed by a continuous co-extrusion blow molding process.

52. The storage container of claim 46 wherein the lid is formed by an injection molding process.

53. The storage container of claim 46 wherein the recess is disposed in the lower section of the upper rim.

54. The storage container of claim 46 wherein the recess is disposed in the upper section of the upper rim.

55. The storage container of claim 46 wherein the upper rim further comprises a middle section, the lower section extending laterally outward and upward before being connected to the middle section, the middle section extending upward from the lower section to the upper section, the upper section extending laterally inward, the upper section providing an upper flat engagement surface for the lid, the upper section terminating at a downwardly protruding lip, the downwardly protruding lip.

56. The storage container of claim 55 wherein the recess is disposed in the middle section of the upper rim.

* * * * *